(12) United States Patent
Mildner et al.

(10) Patent No.: US 10,286,963 B2
(45) Date of Patent: May 14, 2019

(54) STRUCTURAL NODES FOR A MOTOR VEHICLE BODYWORK

(71) Applicant: GM GLOBAL TECHNOLOGY OPERATIONS LLC, Detroit, MI (US)

(72) Inventors: Udo Mildner, Ruesselsheim (DE); Jose Sousa Dias, Ruesselsheim (DE); Lothar Teske, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 87 days.

(21) Appl. No.: 15/422,632

(22) Filed: Feb. 2, 2017

(65) Prior Publication Data

US 2017/0225719 A1 Aug. 10, 2017

(30) Foreign Application Priority Data

Feb. 4, 2016 (DE) .................... 10 2016 001 241

(51) Int. Cl.
*B60J 7/00* (2006.01)
*B62D 27/02* (2006.01)
*B62D 23/00* (2006.01)
*B62D 25/04* (2006.01)
*B62D 25/06* (2006.01)

(52) U.S. Cl.
CPC ........... *B62D 27/023* (2013.01); *B62D 23/00* (2013.01); *B62D 25/04* (2013.01); *B62D 25/06* (2013.01); *B62D 27/026* (2013.01)

(58) Field of Classification Search
CPC . H01H 9/12; H01H 9/02; H02K 11/40; B60N 2/242; B64C 27/48; C09J 163/00; C09J 4/00; C08G 18/10; C08L 67/04; Y10T 29/49805

USPC ................................. 296/203.01, 30
See application file for complete search history.

(56) References Cited

U.S. PATENT DOCUMENTS

| 3,769,772 A | * | 11/1973 | Oetiker | .................. | A47C 17/64 |
| | | | | | 52/646 |
| 4,634,173 A | | 1/1987 | Aonuma et al. | | |
| 4,646,653 A | * | 3/1987 | Balbi | ....................... | B61D 7/00 |
| | | | | | 105/406.1 |
| 4,938,525 A | * | 7/1990 | Yamauchi | ............... | B60R 22/24 |
| | | | | | 296/187.03 |

(Continued)

FOREIGN PATENT DOCUMENTS

| DE | 102009051036 A1 | 5/2011 |
| DE | 102010055444 A1 | 6/2012 |

(Continued)

OTHER PUBLICATIONS

Great Britain Patent Office, Great Britain Search Report for Great Britain Application No. GB1701374.9, dated Jun. 29, 2017.

(Continued)

*Primary Examiner* — Kiran B Patel
(74) *Attorney, Agent, or Firm* — Lorenz & Kopf, LLP

(57) ABSTRACT

Three structural components meet at a structural node for a motor vehicle bodywork. The structural components are fitted together from at least one outer part and one an inner part in each case. A reinforcement part is arranged in a hollow space formed in one of the structural components and is fixed to the inner part of at least a first structural part and the outer part of at least a second structural part.

15 Claims, 5 Drawing Sheets

(56) References Cited

U.S. PATENT DOCUMENTS

| | | | | |
|---|---|---|---|---|
| 5,458,393 A * | 10/1995 | Benedyk | ............... | B62D 23/005 280/798 |
| 5,806,919 A * | 9/1998 | Davies | ................. | B62D 29/002 296/187.02 |
| 6,068,424 A * | 5/2000 | Wycech | ................. | B62D 25/04 156/293 |
| 6,217,109 B1 * | 4/2001 | Okana | ................. | B62D 25/025 296/187.12 |
| 6,270,600 B1 * | 8/2001 | Wycech | ................. | B29C 44/12 156/79 |
| 6,322,135 B1 * | 11/2001 | Okana | ................. | B62D 25/025 296/193.05 |
| 6,578,909 B1 | 6/2003 | Reed et al. | | |
| 7,963,591 B2 * | 6/2011 | Duguet | ................. | B62D 25/04 296/203.03 |
| 8,033,595 B2 * | 10/2011 | Orii | ........................ | B62D 33/06 280/801.1 |
| 8,163,116 B2 * | 4/2012 | Riley | ................... | B62D 23/005 156/294 |
| 8,262,152 B2 * | 9/2012 | Okumura | ............. | B62D 21/157 296/187.12 |
| 8,491,046 B2 * | 7/2013 | Nagai | .................... | B62D 25/02 296/146.6 |
| 8,845,009 B2 * | 9/2014 | Kurokawa | ............. | B62D 25/06 296/187.12 |
| 8,960,779 B2 * | 2/2015 | Nishimura | ............. | B62D 25/06 296/203.03 |
| 9,162,710 B1 * | 10/2015 | Yamamoto | ............. | B62D 25/16 |
| 9,266,569 B1 * | 2/2016 | Tew | ........................ | B62D 25/04 |
| 9,290,208 B2 * | 3/2016 | Kishima | ............ | B62D 25/2036 |
| 9,302,711 B2 * | 4/2016 | Ebihara | ................... | B62D 25/08 |
| 9,302,715 B2 * | 4/2016 | Kim | ................... | B62D 25/2036 |
| 9,340,237 B2 * | 5/2016 | Kurokawa | ........... | B62D 29/005 |
| 9,381,945 B2 * | 7/2016 | Gim | ....................... | B62D 25/06 |
| 9,616,939 B2 * | 4/2017 | Natsume | ............ | B62D 25/2036 |
| 9,718,497 B2 * | 8/2017 | Nakayama | ........... | B62D 21/157 |
| 9,725,120 B2 * | 8/2017 | Stein | ...................... | B62D 25/08 |
| 9,738,326 B2 * | 8/2017 | Chai | .................... | B62D 25/087 |
| 9,878,743 B2 * | 1/2018 | Maruyama | ........... | B62D 25/088 |
| 2003/0137162 A1 * | 7/2003 | Kropfeld | .............. | B62D 29/002 296/203.01 |
| 2006/0066135 A1 * | 3/2006 | Yatabe | ................... | B62D 25/04 296/203.01 |
| 2010/0090501 A1 | 4/2010 | Kinoshita et al. | | |
| 2010/0140981 A1 * | 6/2010 | Mildner | ................ | B62D 21/157 296/209 |
| 2011/0133517 A1 * | 6/2011 | Leanza | ................... | B62D 27/02 296/203.01 |
| 2015/0251705 A1 * | 9/2015 | Mildner | ................ | B62D 25/20 296/187.08 |
| 2015/0344072 A1 * | 12/2015 | Mildner | ................ | B62D 21/152 296/187.11 |
| 2016/0129747 A1 * | 5/2016 | Mildner | ................ | B62D 25/088 280/124.155 |

FOREIGN PATENT DOCUMENTS

DE 102012009970 A1 11/2012
DE 102013211576 A1 12/2014

OTHER PUBLICATIONS

German Patent Office, German Search Report for German Patent Application No. 10 2016 001 241.2 dated Oct. 19, 2016.

* cited by examiner

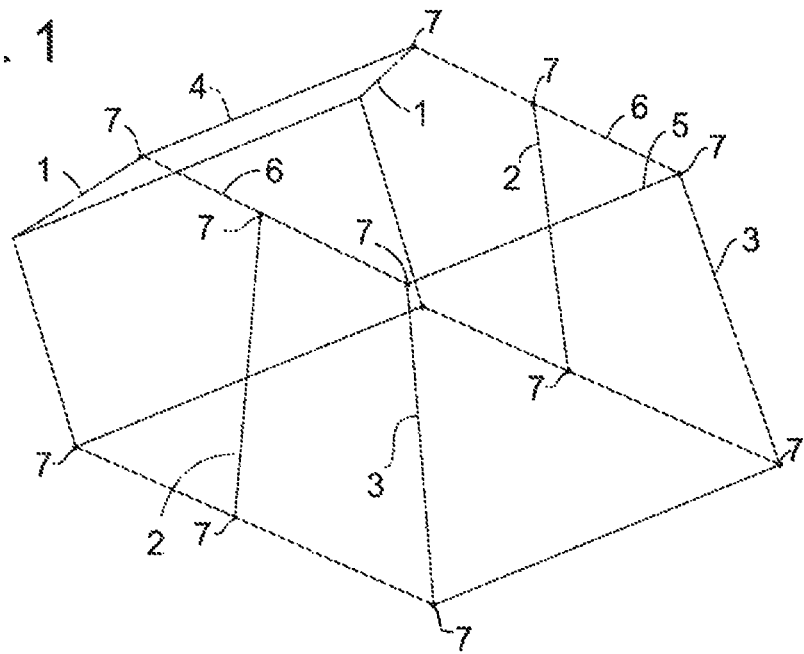
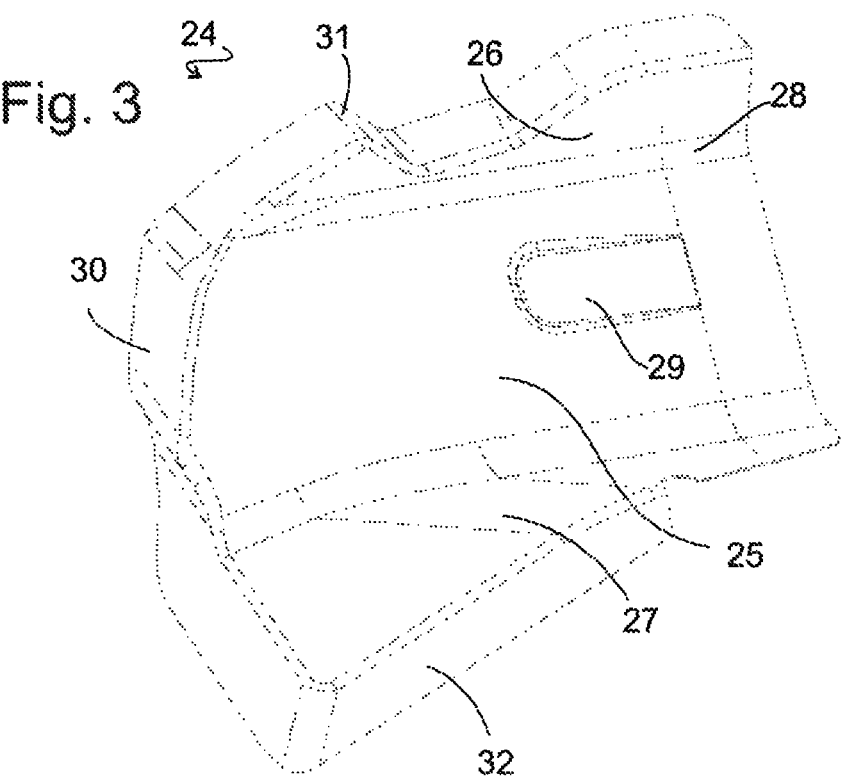

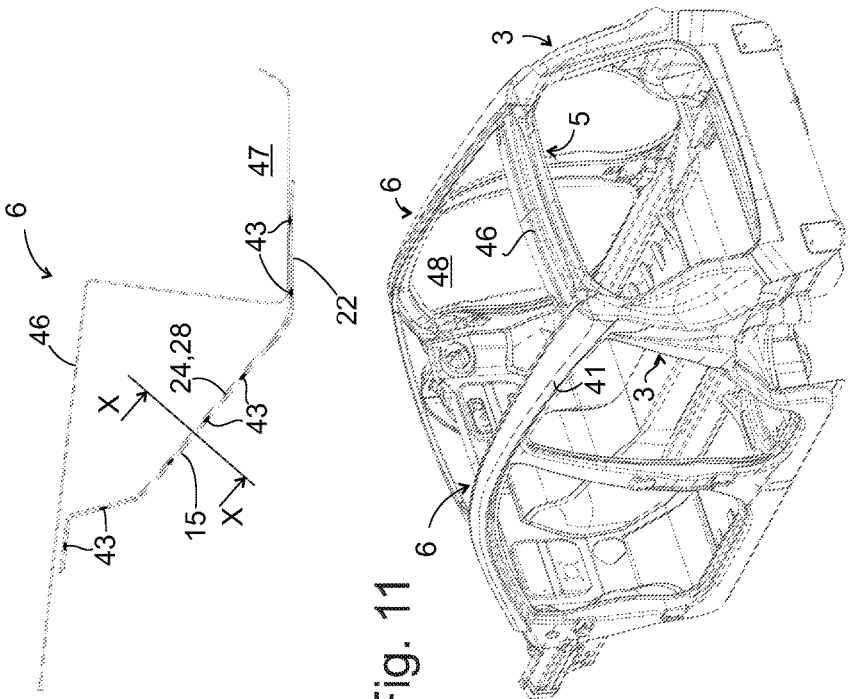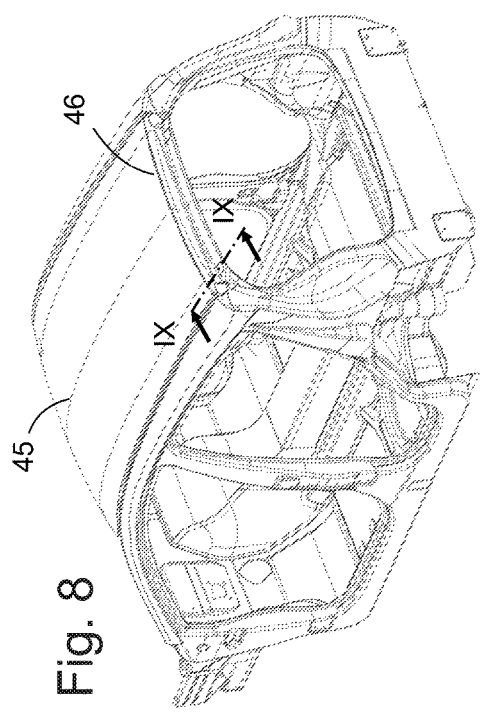

STRUCTURAL NODES FOR A MOTOR VEHICLE BODYWORK

CROSS-REFERENCE TO RELATED APPLICATION

This application claims priority to German Patent Application No. DE102016001241.2, filed Feb. 4, 2016, which is incorporated herein by reference in its entirety.

TECHNICAL FIELD

The present disclosure pertains to the structure of a structural node, at which a plurality of supporting structural components meet in a motor vehicle bodywork.

BACKGROUND

The structure of a node is of great importance for the stability, in particular the torsional rigidity, of the bodywork as a whole. The more stable the structural nodes themselves, the lighter are the structural components that can be used to achieve a required stability, and weight savings thus achieved contribute towards a reduction in fuel consumption.

A structural node for a motor vehicle bodywork is known from DE 10 2009 051 036, in which a reinforcement part cast from light metal includes three grooves, each of which accommodates one of three structural components. The structural components are fixed to the reinforcement part by rivets distributed at the bottom and side walls of the grooves. In order to increase the buckling strength of the reinforcement part, ribs extending transversely through the grooves can be provided. The latter occupy space which, if not present, could be occupied by the structural components themselves. As a consequence, the structural components have to be fixed to the reinforcement part with a long lever arm, which promotes a deformation of the reinforcement part.

SUMMARY

According to the present disclosure, a structural node is provided with a high loading capacity along with low weight. In an embodiment of the present disclosure, a structural node is formed for a motor vehicle bodywork at which three structural components meet. The structural components are fitted together from an outer part and an inner part in each case. A reinforcement part is arranged in a hollow space formed by the structural components and is fixed to the inner part of at least a first structural part and the outer part of at least a second structural part.

Such a reinforcement part can, as a result of torque acting on the structural components, be subjected not only to bending stress, but also to axial and in particular tensile stress. Even with a thinner wall thickness of the reinforcement part, much more effective stiffening can be achieved than with a reinforcement part essentially subjected to bending stress.

The reinforcement part can be fixed by welding to the inner part of the first structural part. A connection with high loading capacity can thus be created even with a small wall thickness, since welding, in contrast with a riveted joint, is not necessarily accompanied by a structural weakening of the parts fixed to one another.

The reinforcement part can be fixed by adhesion to the outer part of the second structural part. Weld traces on the outer part can thus be avoided, which is particularly attractive when the outer part remains visible on the finished vehicle. Selecting an adhesive joint can however also be expedient if the connection region between the reinforcement part and the outer part is difficult to reach for welding after the fitting-together of the parts.

A decisive contribution can also be made to the strength of the structural node by the fact that the structural parts are fixed to one another not only via the reinforcement part, but also directly. For this purpose, the outer part of one of the structural parts can include an edge which is fixed to the outer part of at least another one of the structural parts, or the inner part of one of the structural parts can include an edge which is fixed to the inner part of at least another one of the structural parts.

In order to optimize the tensile loading capacity of the reinforcement part, the reinforcement element can include, between a first flange fixed to the first structural part and a second flange fixed to the second structural part, a central portion extending rectilinearly between the flanges.

A projection of the central portion lying adjacent to the inner part is useful for unequivocally establishing the installation position of the reinforcement part in the structural node even when the inner and outer parts of the structural components are not yet all connected to one another, so that after the fitting-together of all the parts the second flange lies against the outer part of the second structural component in such a way that both can be fixed securely to one another.

For the further stiffening of the structure, the projection can for its part be fixed to the inner part. The projection can be formed on the reinforcement part by an embossing or deep-drawing operation. The entire reinforcement part is preferably formed from one piece of flat material, in particular a steel plate.

For the sake of easier production, the reinforcement part can be fixed in the case of each structural part either to its outer part or its inner part. The reinforcement part can also be fixed to the outer part of the third structural part.

At least one roof frame and a pillar supporting the roof frame are preferably located beneath the structural components. The reinforcement element is particularly effective if it is positioned at the corners, in particular the rear corners, of a vehicle roof, i.e. if a longitudinally running roof frame and a transversely running, in particular rear roof frame are beneath the structural components. With such a vehicle roof, the transversely running roof frame is preferably the first structural part. The connection portions of reinforcement parts can thus be arranged at both ends of the transversely running roof frame essentially along one and the same line, so that the roof frame virtually cannot be deformed by tensile loading in the vehicle transverse direction.

BRIEF DESCRIPTION OF THE DRAWINGS

The present embodiments will hereinafter be described in conjunction with the following drawing figures, wherein like numerals denote like elements.

FIG. 1 shows a diagram of the passenger compartment of a motor vehicle

FIG. 3 shows a perspective view of a reinforcement part;

FIG. 8 shows the motor vehicle bodywork in a late construction stage, with a closed roof;

FIG. 9 shows a detail from FIG. 8 in cross-section;

FIG. 10 shows a cross-section along the plane X-X of FIG. 8; and

FIG. 11 shows a representation, analogous to FIG. 8, of a motor vehicle bodywork with an open roof.

DETAILED DESCRIPTION

Figure 2:
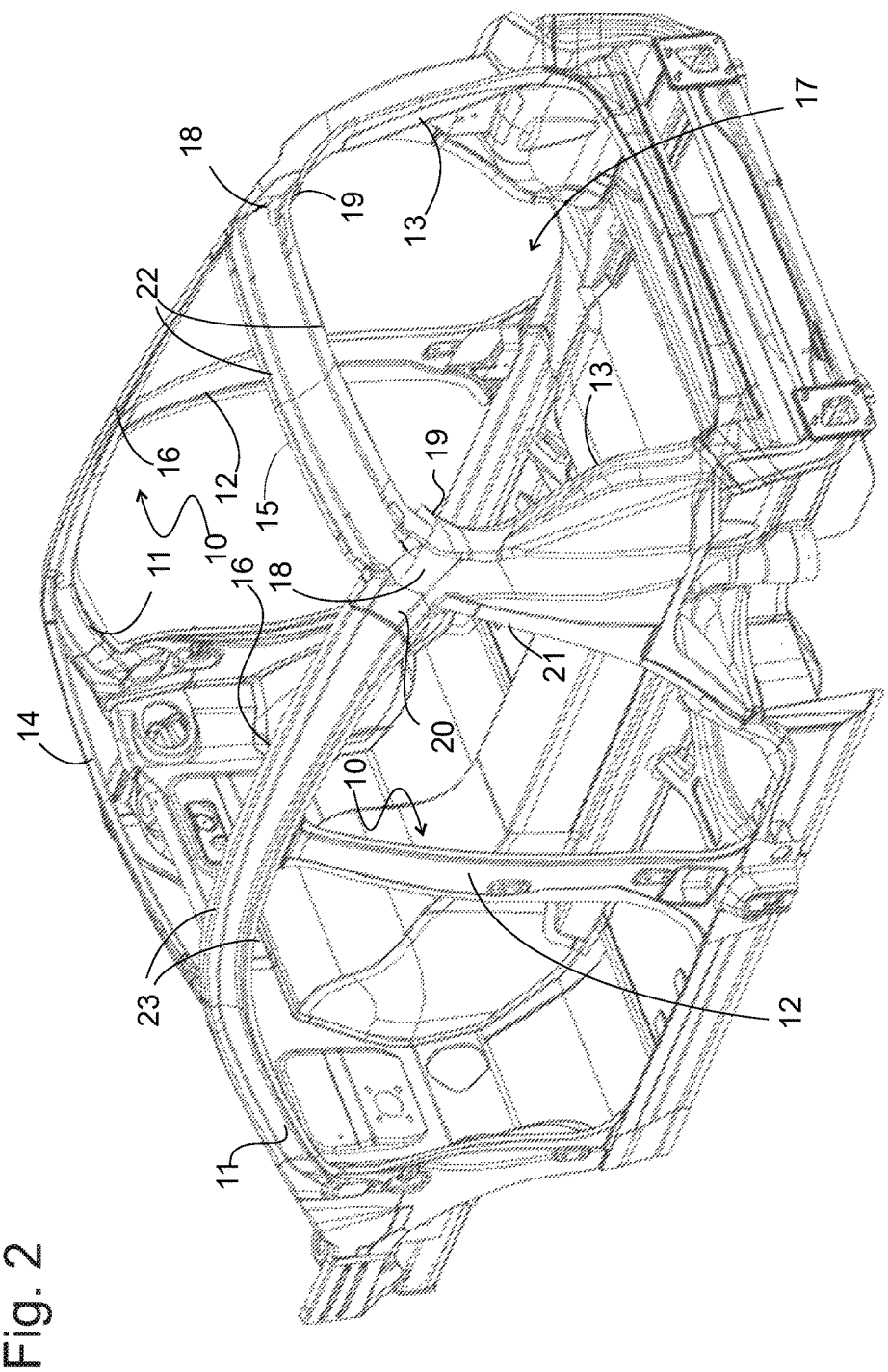
FIG. 2 shows a motor vehicle bodywork in an early construction stage.

The following detailed description is merely exemplary in nature and is not intended to limit the invention or the application and uses of the invention. Furthermore, there is no intention to be bound by any theory presented in the preceding background of the invention or the following detailed description.

FIG. 1 shows in very diagrammatic form a passenger compartment of a motor vehicle. Elongated structural components, here A-, B- and C-pillars 1, 2, 3 as well as a front, a rear and side roof frames 4, 5, 6 are connected to one another rigidly at structural nodes 7 and border areas which are filled by window panes, doors, a boot lid or suchlike and the contribution whereof to the torsional rigidity of the passenger compartment is rather small compared to structural components 1-6. The present disclosure is explained in the following on the basis of rear structural nodes 7, at which C-pillars 3 meet side roof frames 6 and rear roof frame 5; it can also be applied to other structural nodes 7.

FIG. 2 shows an unfinished motor vehicle bodywork in an early construction stage. The side walls on the inside 10 can be seen, which each form inner parts 11, 12, 13 of still incomplete A, B and C-pillars 1, 2, 3, as well as inner parts 14, 15 and 16 of front, rear and side roof frames 4, 5, 6. The bodywork is in the fastback or estate car design; the rear roof-frame inner part 15 and inner parts 13 of the C-pillars border a boot opening 17 at a steeply sloping vehicle rear. C-pillar inner part 13, side roof-frame inner part 16 and rear roof-frame inner part 15 each border a channel open towards the bodywork exterior. The channels meet at upper rear corners 18 of the bodywork, and mutually overlapping flanges 19, 20 (also shown in FIG. 10), at the ends of inner parts 13, 15, 16 are welded together. Flanges 21, 22, 23 running along the longitudinal edges of inner parts 13, 15, 16 are provided in order to be welded at a subsequent assembly stage with outer parts of the C-pillar, of the rear roof frame and of the side roof frame. Flange 21 is also shown in FIG. 10 and flange 22 is also shown in FIG. 9.

FIG. 3 shows in a perspective view a left-hand reinforcement part 24, which is provided to be assembled approximately in the orientation in which it is shown in FIG. 3, at left-hand upper rear corner 18. A reinforcement part shown as a mirror-image to the latter is provided for right-hand upper rear corner 18. Reinforcement part 24 is formed in one piece from a sheet metal blank like front and rear roof frames 4, 5 and structural node 7 and using the same techniques. The cross-section of reinforcement part 24 for the most part follows that of rear roof-frame inner part 15. An essentially flat central portion 25 and flanks 26, 27 adjacent thereto above and below replicate the cross-section of inner part 15 and form at their right-hand edges a flange 28 bounded in the figure by a broken line, the flange being provided to be inserted into the channel of inner part 15 and welded therein.

A wedge-shaped projection 29 projecting towards the side facing away from the observer is embossed in central portion 25. Projection 29 splays reinforcement part 24 and inner part 15 apart from one another, so that central portion 25 at its left-hand edge becomes increasingly distant from inner part 15.

A flange 30 is bent off at an angle at the left-hand edge of central portion 25. Further bent-off flanges 31, 32 extend along the edges of flanks 26, 27.

Figure 4:
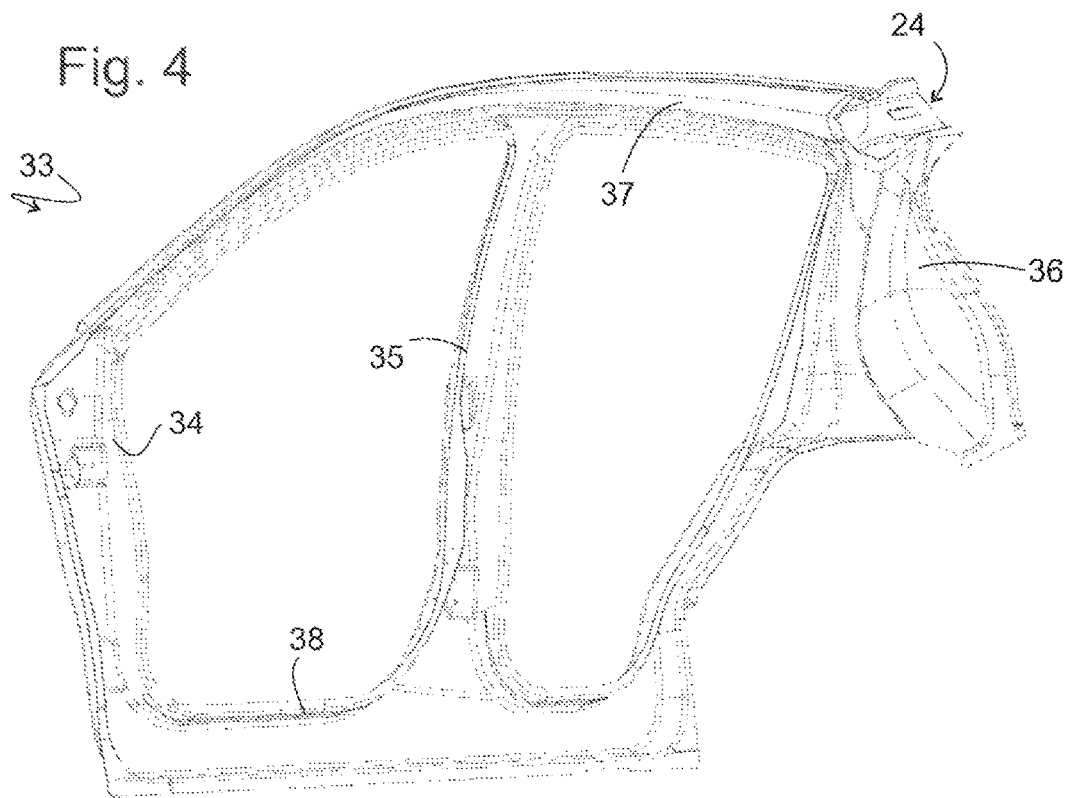
FIG. 4 shows the reinforcement part, fitted to the side wall on the inside of the motor vehicle bodywork from FIG. 2.

FIG. 4 shows an assembly 33, which is provided for mounting on the left-hand side wall on the inside 10 of the unfinished bodywork shown in FIG. 1. Assembly 33 includes wall elements 34, 35, 36, which are positioned for the completion of A-, B- and C-pillar 1, 2, 3 on inner parts 11, 12 and 13, a wall element 37 for supplementing side roof frame 6, a sill strip 38 and, at a rear upper corner of the assembly at which wall elements 36 and 37 meet reinforcement part 24.

Figure 5:
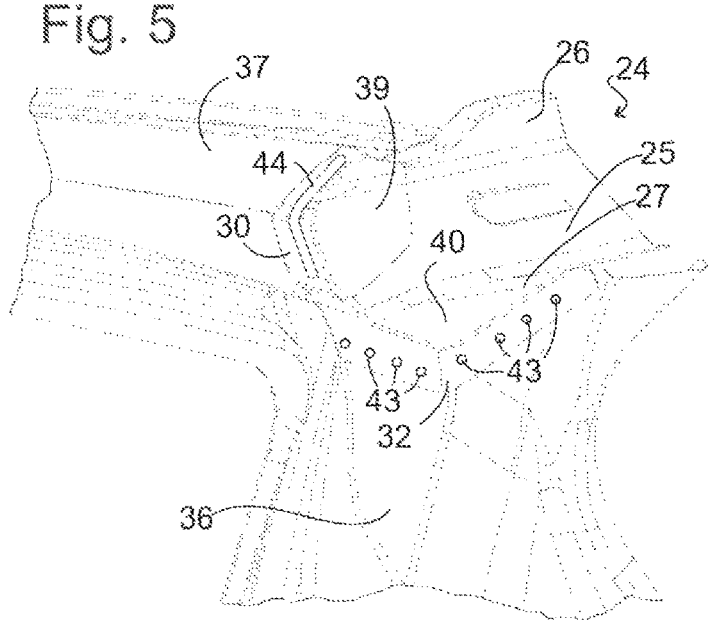
FIG. 5 shows an enlarged detail from FIG. 4.

FIG. 5 shows an enlarged view of the rear upper corner of assembly 33. A left-hand edge region 39 of central portion 25 and wall element 36 project laterally beyond wall element 37, flank 27 forming in a similar manner a bulkhead 40 projecting backwards beyond wall element 36.

Figure 6:
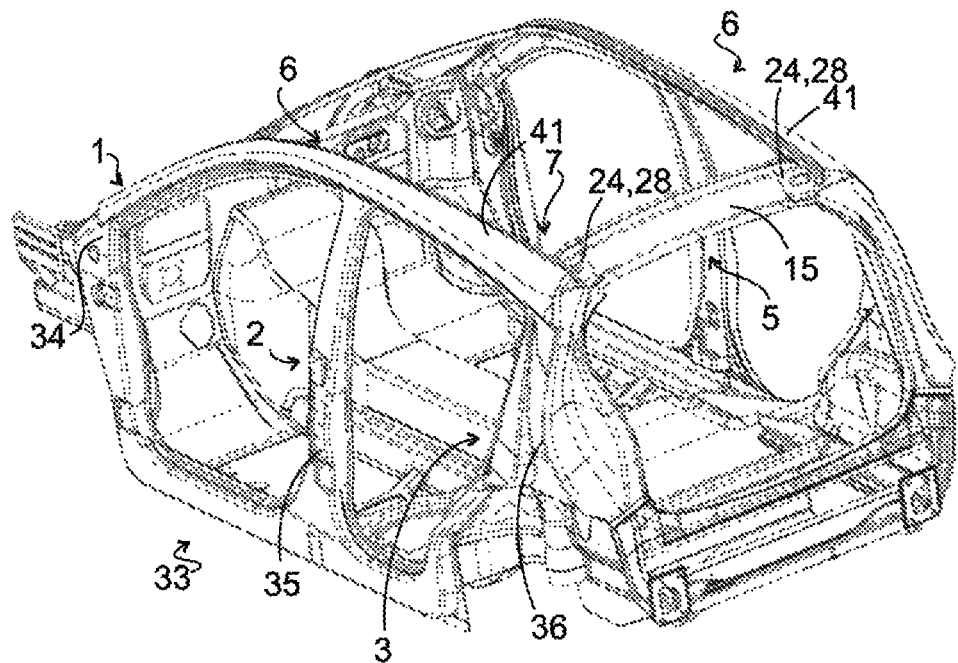
FIG. 6 shows the motor vehicle bodywork in a mid-point construction stage.

In the view of FIG. 6, assembly 33 is mounted on the bodywork, so that A-, B- and C-pillar 1, 2, 3, are complete; moreover, a cover 41 is fitted over wall element 37, which cover, together with wall element 37 covered by it and inner part 16 lying behind, forms side roof frame 6. Cover 41 extends at its rear end down to flange 32 on lower flank 27 of reinforcement part 24 and is fixed to the latter by spot welds 43, the locations whereof are denoted in FIG. 5 by circles distributed along flange 32. Flange 30 is inaccessible after the positioning of cover 41, cover 41 being fixed to it by an adhesive bead 44 (see FIG. 5).

Figure 7:
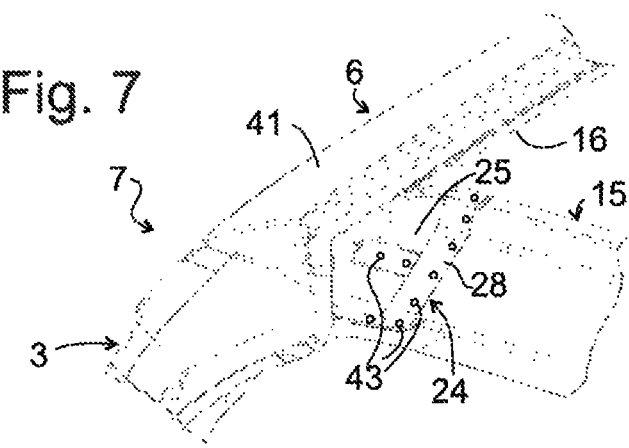
FIG. 7 shows an enlarged detail from FIG. 6.

A portion of reinforcement part 24 with flange 28 projects beneath cover 41. As can be seen in the enlarged detail view of FIG. 7, central portion 25 essentially extends along inner part 15 of the rear roof frame and is fixed to the latter by spot welds 43, which are distributed along flange 28 and on projection 29.

In the next construction stage shown in FIG. 8, a roof panel 45 is inserted between the two side roof frames 6, the roof panel covering flanges 28 of reinforcement parts 24. FIG. 9 shows a cross-section through the rear edge of roof panel 45 and rear roof-frame inner part 15 along the cross-sectional plane depicted in FIG. 6 with IX-IX. The cross-sectional plane runs through flange 28 of one of reinforcement parts 24 and shows a plurality of spot welds 43, by which the reinforcement part and inner part 15 are fixed to one another. The rear edge of roof panel 45 forms here an outer part 46 of rear roof frame 5, which is welded along one of its two flanges 22 to a hollow profile. An edge of outer part 46 projecting backwards beyond flange 22 is bent up in order to form a drainage channel 47 for rainwater above the boot opening.

FIG. 10 shows a cross-section in a vehicle transverse direction through left-hand reinforcement part 24 and its surroundings along the plane denoted in FIG. 9 with X-X. Central portion 25 and flange 28 of the two reinforcement parts 24 and the portion of rear roof-frame inner part 15 extending between reinforcement parts 24 lie on one and the same line. The lateral end of rear roof-frame inner part 15, on the left of flange 28 in FIG. 10, is bent down and welded to flange 19 of C-pillar inner part 13. Projection 29 is supported on this end. At the end of reinforcement part 24 lying opposite flange 28, flange 30 is bent down at an angle and glued to cover 41 of side roof frame 6. Reinforcement part 24 thus forms on the one hand a cross-bracing between inner parts 15, 13 and cover 41 of respective C-pillar 3, rear roof frame 5, and side roof frame 6 meeting at upper rear corner 18, by which upper rear corner 18 is stiffened, whilst on the other hand a transverse connection between the two side walls 10 of the bodywork that is virtually non-deformable by tensile loading is created as a result of the connection of reinforcement parts 24 on both sides of the bodywork via rear inner part 15, FIG. 11 shows an alternative embodiment of the vehicle bodywork in a representation similar to FIG. 8. Instead of a roof panel extending over the entire length of the roof, an outer part 46 is affixed here to inner part 15, the dimensions of which outer part are roughly the same as those of inner part 15 in the vehicle longitudinal direction. A roof module can be inserted into opening 48 of the roof remaining open, the roof module being able to be constituted differently according to the customer's wishes, e.g. with a glazing, a sliding roof or suchlike. Since the roof module here, in contrast with the closed roof of FIG. 8, can make only a relatively small contribution to the torsional rigidity of the passenger compartment, the contribution of reinforcement part 24 is particularly important here.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A body structure for a motor vehicle bodywork comprising:
    an inner frame assembly having a C-pillar inner part, a side roof frame inner part, and a rear roof frame inner part joining the C-pillar inner part at a first overlap flange and joining the side roof frame inner part at a second overlap flange, the C-pillar, side roof frame and rear roof frame inner parts forming a structural node of the body structure;
    an outer frame assembly having a first wall member secured to the C-pillar inner part, and a second wall member secured to the side roof frame inner part; and
    a reinforcement part having a central portion that is substantially flat, a first flange disposed at a first angle relative to the central portion and secured to the C-pillar inner part, a second flange disposed at a second angle relative to the central portion and secured to the side roof frame inner part, and a third flange disposed at a third angle relative to the central portion and secured to the rear roof frame inner part, the central portion forming a web interconnecting the first, second and third flanges.

2. The body structure according to claim 1, further comprising a weldment joint fixing the third flange of the reinforcement part to the rear roof frame inner part.

3. The body structure according to claim 2, further comprising an adhesion interface fixing the second flange of the reinforcement part to the side roof frame inner.

4. The body structure according to claim 1, further comprising an adhesion interface fixing the second flange of the reinforcement part to the side roof frame inner part.

5. The body structure according to claim 1, wherein the central portion has an edge, and further comprising a wedge-shaped projection formed in the central portion and separating the rear roof frame inner part from the reinforcement part so that central portion at the edge is splayed away from the rear roof frame inner part.

6. The body structure according to claim 5, wherein the projection is fixed to the rear roof frame inner part.

7. The body structure according to claim 1, wherein the C-pillar inner part and the first wall member form a body pillar and the side roof frame inner part and the second wall member form a longitudinal roof frame rail.

8. The body structure according to claim 1, further comprising a body panel secured to the rear roof frame inner part and covering at least the third flange of the reinforcement member.

9. The body structure according to claim 8, wherein the reinforcement part further comprises a flank supporting the body panel, the flank disposed at a fourth angle relative to the central portion, the flank separating the central portion from the third flange and extending from the central portion to the third flange.

10. The body structure according to claim 9, wherein the rear roof frame inner part comprises a transverse roof frame rail.

11. The body structure according to claim 1, wherein the reinforcement part further comprises a bulkhead extending between the central region and the first flange.

12. The body structure according to claim 1, further comprising a cover fitted over the second wall member, the cover extending down and secured to the second flange.

13. The body structure according to claim 1, wherein the side roof frame inner part includes a channel and wherein the third flange is disposed in the channel.

14. The body structure according to claim 1, wherein the central portion includes a top edge and a bottom edge, wherein the reinforcement part includes a first flank at the top edge that spaces the third flange from the central portion and extends from the third flange to the central portion, and wherein the reinforcement part includes a second flank at the bottom edge that spaces the first flange from the central portion and extends from the first flange to the central portion.

15. The body structure according to claim 1, wherein the central portion has a side edge, and further comprising a wedge-shaped projection formed in the central portion and embossed in central portion, the wedge-shaped projection separating the rear roof frame inner part from the reinforcement part so that central portion at the side edge is splayed away from the rear roof frame inner part, spacing the side edge away from the rear roof frame inner part.

* * * * *